(12) United States Patent
Koizumi

(10) Patent No.: US 6,181,479 B1
(45) Date of Patent: Jan. 30, 2001

(54) EYEPIECE LENS FOR A DISPLAY IMAGE OBSERVATION DEVICE

(75) Inventor: Noboru Koizumi, Omiya (JP)

(73) Assignee: Fuji Photo Optical Co., Ltd., Omiya (JP)

( * ) Notice: Under 35 U.S.C. 154(b), the term of this patent shall be extended for 0 days.

(21) Appl. No.: 09/391,043

(22) Filed: Sep. 16, 1999

(30) Foreign Application Priority Data

Sep. 30, 1998 (JP) .................................................. 10-276709

(51) Int. Cl.$^7$ .................................................. G02B 25/00
(52) U.S. Cl. ..................... 359/645; 359/643; 359/713; 359/716; 359/757; 359/784
(58) Field of Search .................... 359/643, 645, 359/713, 716, 757, 784

(56) References Cited

U.S. PATENT DOCUMENTS

| | | | |
|---|---|---|---|
| 3,768,890 | * 10/1973 | Osawa et al. | 359/644 |
| 4,054,370 | * 10/1977 | Fleischman | 359/644 |
| 4,099,842 | * 7/1978 | Kaneko | 359/644 |
| 4,285,578 | * 8/1981 | Yamashita et al. | 359/644 |
| 4,497,546 | * 2/1985 | Kobayashi et al. | 359/644 |
| 4,730,905 | * 3/1988 | Takada | 359/645 |
| 5,202,795 | * 4/1993 | Kashima | 359/645 |
| 5,299,065 | * 3/1994 | Watanabe | 359/759 |
| 5,612,823 | * 3/1997 | Koizumi | 359/644 |
| 5,638,213 | * 6/1997 | Ueno | 359/643 |
| 5,684,635 | * 11/1997 | Sugawara | 359/643 |
| 5,748,380 | * 5/1998 | Yanari | 359/646 |
| 5,757,553 | * 5/1998 | Sugawara | 359/643 |
| 5,812,324 | * 9/1998 | Fukumoto | 359/643 |
| 5,875,057 | * 2/1999 | Kato | 359/645 |
| 5,877,900 | * 3/1999 | Omura | 359/644 |
| 5,959,782 | * 9/1999 | Hankawa | 359/643 |
| 5,969,873 | * 10/1999 | Sugawara | 359/645 |
| 5,986,816 | * 11/1999 | Shikama | 359/644 |
| 6,069,750 | * 5/2000 | Koizumi et al. | 359/783 |
| 6,104,542 | * 8/2000 | Omura | 359/643 |

FOREIGN PATENT DOCUMENTS 6-308396   11/1994   (JP) .

* cited by examiner

*Primary Examiner*—Georgia Epps
*Assistant Examiner*—Evelyn A. Lester
(74) *Attorney, Agent, or Firm*—Arnold International; Bruce Y. Arnold

(57) ABSTRACT

An eyepiece lens for a display image observation device is disclosed that has only six lens elements with refractive power, in the order from the eye side, as follows: a first lens group $G_1$ formed of two lens elements $L_1$ and $L_2$, both of positive refractive power, with the lens element $L_1$ on the eye side being of positive meniscus shape with its convex surface on the eye side; a second lens group $G_2$ formed of two lens elements $L_3$ and $L_4$ which are either separated by air or cemented together, the first of the lens elements on the eye side (i.e., $L_3$) having negative refractive power and the other having positive refractive power; and a third lens group $G_3$ formed of two lens elements which are either separated by air or cemented together, the first of the lens elements on the eye side (i.e., $L_5$) having positive refractive power and the other having negative refractive power. Preferably, one of the surfaces of the lens elements in the first lens group $G_1$ is aspherical, and specified conditions are satisfied in order to achieve favorable aberration correction in an eyepiece lens that is compact.

6 Claims, 12 Drawing Sheets

EMBODIMENT 1

EMBODIMENT 1

EMBODIMENT 3

EMBODIMENT 4

EYEPIECE LENS FOR A DISPLAY IMAGE OBSERVATION DEVICE

BACKGROUND OF THE INVENTION

Heretofore, various types of display image observation devices have been conventionally known which display a desired image from an image display element, such as a liquid crystal display panel, and which enlarge the image using an eyepiece. An example of such an eyepiece used in a display image observation device is the eyepiece disclosed in Japanese Laid-Open Patent Application H6-308396. This eyepiece makes it possible to obtain a flat and clear image throughout the periphery of the field while using only a few lens elements by employing an aspherical surface and by making the object surface (i.e., the source image) a curved surface. However, this eyepiece is limited to cases where the range for favorably correcting the aberration designates an entrance pupil diameter of less than 4 mm (since the brightest lens disclosed has an $F_{No.}$ of 3.7).

The pupil diameter of most people is in the range from 3 to 4 mm and, when observing in a motionless environment, using a lens with an $F_{No.}$ of 3.7 gives satisfactory results. However, when the observation is accompanied by vibrations or other motion, such as while the observer is riding in an automobile or while walking, the entrance pupil of the eyepiece and the pupil of the observer can be temporarily offset as much as 3 to 5 mm due to the vibrations or other motion. Therefore, if the various aberrations are not favorably corrected for an entrance pupil of several tens of millimeters, then the viewed image will deteriorate to an inferior image quality as a result of the vibrations or other motions. This breakdown in the image quality causes favorable observation under such conditions to become difficult.

BRIEF SUMMARY OF THE INVENTION

The present invention is an eyepiece for a display image observation device used when enlarging and observing images displayed in an image display device. More specifically, the present invention relates to an eyepiece for observing an image of an object that is formed at an image display surface of an image intensifier which intensifies low-level light collected by an object lens of a night vision device. A first object of the present invention is to provide an eyepiece for a display image observation device that is light in weight. A second object of the invention is to provide such an eyepiece that is also compact. A third object of the invention is to provide such an eyepiece that enables viewing with high image quality even during unfavorable viewing conditions, such as when the observer is riding in a vehicle or while walking.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
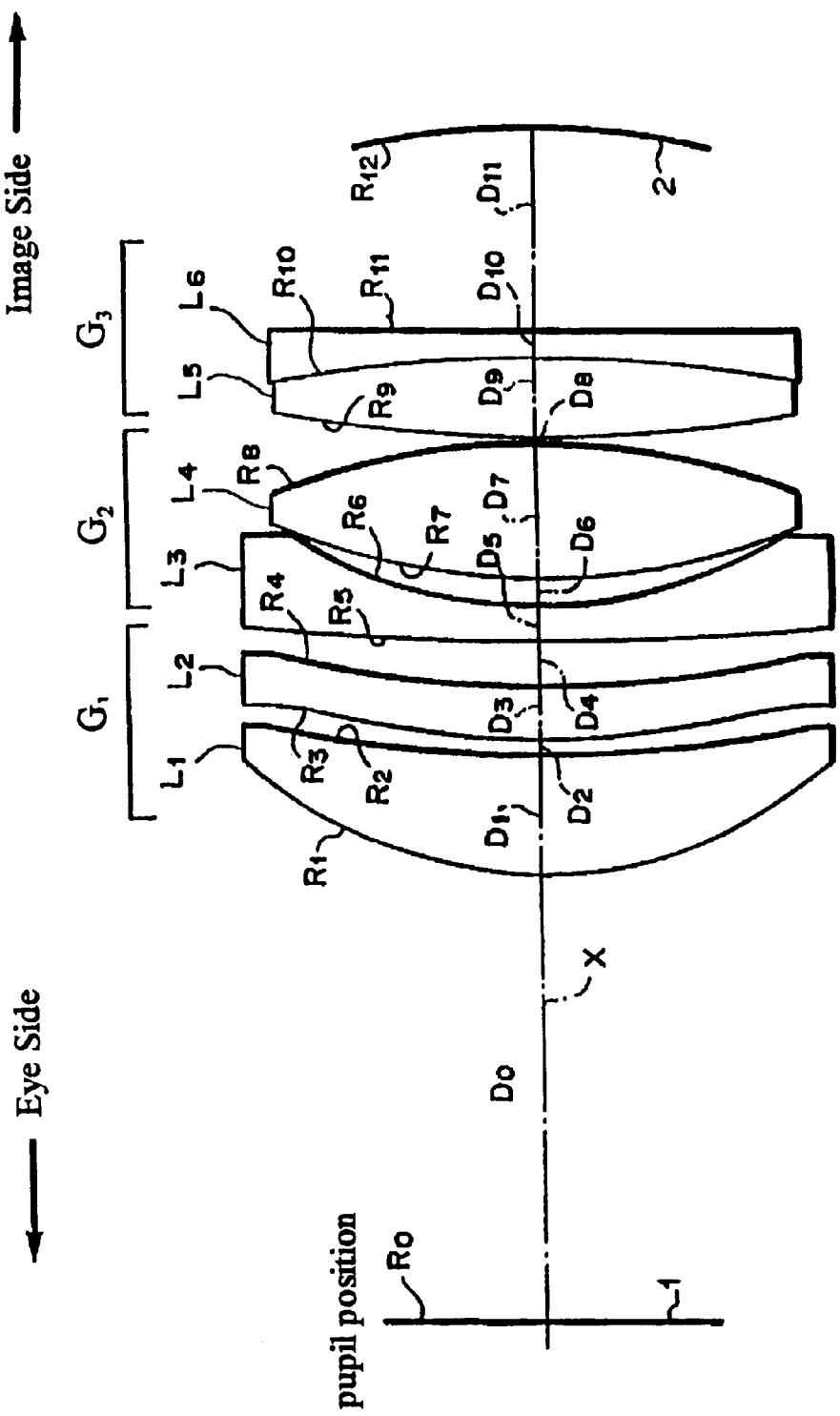
FIG. 1 shows the basic lens element configuration of the lens of Embodiment 1.

The eyepiece for a display image observation device of the present invention includes, in the order from the eye side, a first lens group $G_1$ formed of two lens elements $L_1$ and $L_2$, with both lens elements being of positive refractive power; a second lens group $G_2$ formed either of two lens elements or of a cemented lens having two lens elements, where one lens element $L_3$ has negative refractive power and the other $L_4$ has positive refractive power; and a third lens group $G_3$ formed of either two lens elements or a cemented lens having two lens elements, where one lens element $L_5$ has positive refractive power and the other $L_6$ has negative refractive power. Further, the lens element $L_1$ nearest the eye is of a positive meniscus shape with its convex surface on the eye side; and at least one surface of the lens elements $L_1$ and $L_2$ of the first lens group $G_1$ is aspherical.

Further, it is preferred that the eyepiece of the invention satisfy the following Conditions (1)–(4).

$1.1 < f_1/f < 2.0$            Condition(1)

$-0.09 < f/f_2 < 0.45$          Condition(2)

$1.2 < f_3/f < 7.0$           Condition(3)

$-2.0 < R_i/f < -1.0$          Condition(4)

where f is the focal distance of the eyepiece lens, $f_1$ is the focal distance of the first lens group, $f_2$ is the focal distance of the second lens group, $f_3$ is the focal distance of the third lens group, and $R_i$ is the radius of curvature of the image display surface.

In general, to hold the lens outer diameter small, it is beneficial not to diverge the light rays while holding positive power on the lens element at the eye side (i.e, the observer side) of the first lens group; however, with the configuration of lens elements as described above, the light rays may be favorably deflected, especially by making this lens element in the shape of a positive meniscus with its convex surface on the eye side. On the other band, since spherical aberration and coma are generated when the light ray is deflected so drastically, the configuration described above suppresses the generation of the spherical aberration and coma by employing an aspherical lens surface as a lens surface of the first lens group.

Further, Condition (1) above regulates the focal distance of the first lens group. When falling below the lower limit, the power of the first lens group becomes too strong, thereby making it impossible to correct the spherical aberration and the coma; on the other hand, when exceeding the upper limit, the power of the first lens group becomes too weak, thereby causing the light rays to diverge (since the angle of deflection has become too small). Hence, as the outer diameter of the second lens group must be increased, compactness is lost.

In addition, Condition (2) above regulates the focal distance of the second lens group. When falling below the lower limit, the negative power of the second lens group becomes too strong thereby causing an increase in the positive power of the first lens group and the third lens group. Hence, correction of the spherical aberration, coma, and distortion becomes difficult. On the other hand, when exceeding the upper limit, the positive power of the second lens group becomes too strong, making correction of the spherical aberration and coma difficult.

Furthermore, Condition (3) above regulates the focal distance of the third lens group. When falling below the lower limit, the positive power of the third lens group becomes too strong, thereby increasing the negative distortion. On the other hand, when exceeding the upper limit, the positive power of the first lens group and the second lens group tends to increase, which makes correction of the spherical aberration and coma difficult.

In addition, Condition (4) above regulates the radius of curvature of the image display surface. Since an eyepiece serves basically as a positive lens, the image curves as a concave surface. The amount of curvature is closely related to the power of the eyepiece, and in this way, the curvature of the image surface is regulated. Therefore, when exceeding the upper limit of Condition (4), the image curvature increases. More specifically, the focus slippage at the ends of the field of view becomes too large.

Hereinafter, various embodiments of the invention will be described with reference to the drawing figures.

Embodiment 1

FIG. 1 shows the basic lens element configuration of Embodiment 1. As shown in FIG. 1, the eyepiece of this embodiment is formed of only 6 lens elements $L_1$ through $L_6$, is for observing an image on the image display surface 2 of the image intensifier, and is an eyepiece of a night vision optical device. The specific lens element configuration is, in order from the eye side: a first lens group $G_1$ formed of a first lens element $L_1$ and a second lens element $L_2$, each of which are of positive meniscus shape with their convex surfaces on the eye side; a second lens group $G_2$ formed of a third lens element $L_3$ of negative meniscus shape with its convex surface on the eye side and a fourth lens element $L_4$ that is biconvex; and a third lens group $G_3$ formed of a fifth lens element $L_5$ that is biconvex and cemented to a sixth lens element $L_6$ of a negative meniscus shape with its concave surface on the eye side. The eye-side surface of the second lens element $L_2$ is aspherical. Furthermore, the eyepiece is designed so as to satisfy the above Conditions (1)–(4).

According to the eyepiece for a display image observation device composed in this manner, the object image formed on the image display surface 2 of the image intensifier by way of an object lens is led to the pupil position 1 by way of the lens groups 1, 2 and 3 where it is once again formed on the retina of the eye.

Table 1 below gives the surface number #, in order from the eye side, the radius of curvature R in mm of each surface, the spacing D in mm between each surface, as well as the refractive index $N_d$ and the Abbe constant $v_d$ at the sodium d-line (i.e. λ=587.6 nm) of each lens element of Embodiment 1.

TABLE 1

| # | R | D | $N_d$ | $v_d$ |
|---|---|---|---|---|
| 0 | (Pupil position) | 25.00 | | |
| 1 | 21.5757 | 6.40 | 1.71300 | 53.9 |
| 2 | 63.5050 | 0.74 | | |
| 3* | 30.7310 | 3.00 | 1.49023 | 57.5 |
| 4 | 53.9341 | 2.36 | | |
| 5 | 157.6196 | 1.80 | 1.84666 | 23.8 |
| 6 | 23.3182 | 1.44 | | |
| 7 | 33.4705 | 7.10 | 1.71300 | 53.9 |
| 8 | −34.0300 | 0.30 | | |
| 9 | 72.0373 | 4.30 | 1.71300 | 53.9 |
| 10 | −69.2233 | 1.50 | 1.84666 | 23.8 |
| 11 | −2338.7947 | 10.70 | | |
| 12 | −40.0000 | (Image display surface) | | |
| | f = 25.02 mm | $F_{NO.}$ = 1.79 | ω = 20.9° | |

As shown in the bottom portion of Table 1, the focal distance of the eyepiece lens of Embodiment 1 is 25.02 mm, the $F_{NO.}$ is 1.79, and the half-field angle ω is 20.9 degrees. Any surface marked with a * to the right of the surface number # in Table 1 is an aspherical surface, and the aspherical surface shape is expressed by Equation (A) below.

$$Z=CY^2/\{1+(1-KC^2Y^2)^{1/2}\}+A_4Y^4+A_6Y^6+A_8Y^8+A_{10}Y^{10} \quad \text{(Equation A)}$$

where

Z is the length (in mm) of a line drawn from a point on the aspherical surface at distance Y from the optical axis to the tangential plane of the aspherical surface vertex, C (=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

The values of each of the constants K and $A_4$–$A_{10}$ of the aspherical surface #3 indicated in Table 1 are shown in Table 2.

TABLE 2

| K | $A_4$ | $A_6$ | $A_8$ | $A_{10}$ |
|---|---|---|---|---|
| 1.0000000 | −0.3450584 × $10^{-4}$ | −0.1803346 × $10^{-7}$ | −0.8317521 × $10^{-10}$ | 0.4066094 × $10^{-12}$ |

Embodiment 2

Figure 2:
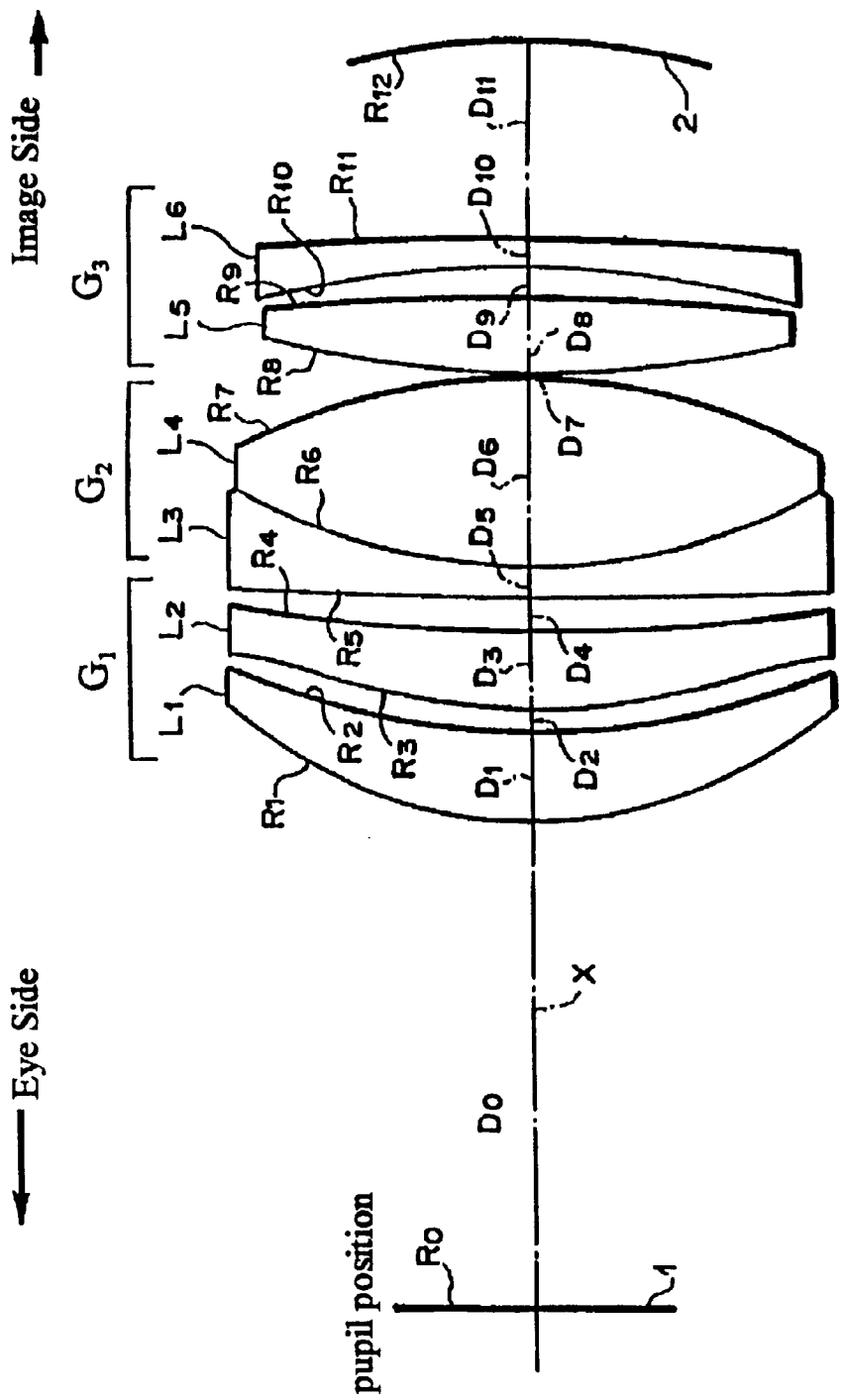
FIG. 2 shows the basic lens element configuration of the lens of Embodiment 2.

The eyepiece lens element configuration of Embodiment 2 is shown in FIG. 2. This configuration is similar to that of FIG. 1, except that the two lens elements $L_3$ and $L_4$ of the second lens group $G_2$ are cemented together, and the two lens elements $L_5$ and $L_6$ are separated by air.

Table 3 below gives the surface number #, in order from the eye side, the radius of curvature R in mm of each surface, the spacing D in mm between each surface, as well as the refractive index $N_d$ and the Abbe constant $v_d$ at the sodium d-line (i.e. λ=587.6 nm) of each lens element of Embodiment 2.

TABLE 3

| # | R | D | $N_d$ | $v_d$ |
|---|---|---|---|---|
| 0 | (Pupil position) | 25.00 | | |
| 1 | 22.5279 | 4.487 | 1.71300 | 53.9 |
| 2 | 36.0209 | 1.066 | | |
| 3* | 25.9026 | 4.110 | 1.49023 | 57.5 |
| 4 | 87.0748 | 1.708 | | |
| 5 | 272.3953 | 1.500 | 1.84666 | 23.8 |
| 6 | 28.6153 | 9.495 | 1.62280 | 56.9 |
| 7 | −32.1562 | 0.300 | | |
| 8 | 52.9744 | 3.996 | 1.71300 | 53.9 |
| 9 | −121.5460 | 1.500 | | |
| 10 | −50.0000 | 1.500 | 1.84666 | 23.8 |
| 11 | −200.0000 | 10.240 | | |
| 12 | −32.0000 | (Image display surface) | | |
| | f = 25.03 mm | $F_{NO.}$ = 1.79 | ω = 21.5° | |

As shown in the bottom portion of Table 3, the focal distance of the eyepiece lens of Embodiment 2 is 25.03 mm, the $F_{NO.}$=1.79, and the half-field angle ω is 21.5 degrees. Any surface marked with a * to the right of the surface number # in Table 3 is an aspherical surface, and the aspherical surface shape is expressed by Equation (A) above. The coefficients that relate to the aspherical surface #3 above are indicated in Table 4.

TABLE 4

| K | $A_4$ | $A_6$ | $A_8$ | $A_{10}$ |
|---|---|---|---|---|
| 1.0000000 | −0.2994343 × 10⁻⁴ | −0.1955347 × 10⁻⁸ | −0.2219328 × 10⁻⁹ | 0.3995139 × 10⁻¹² |

Embodiment 3

Figure 3:
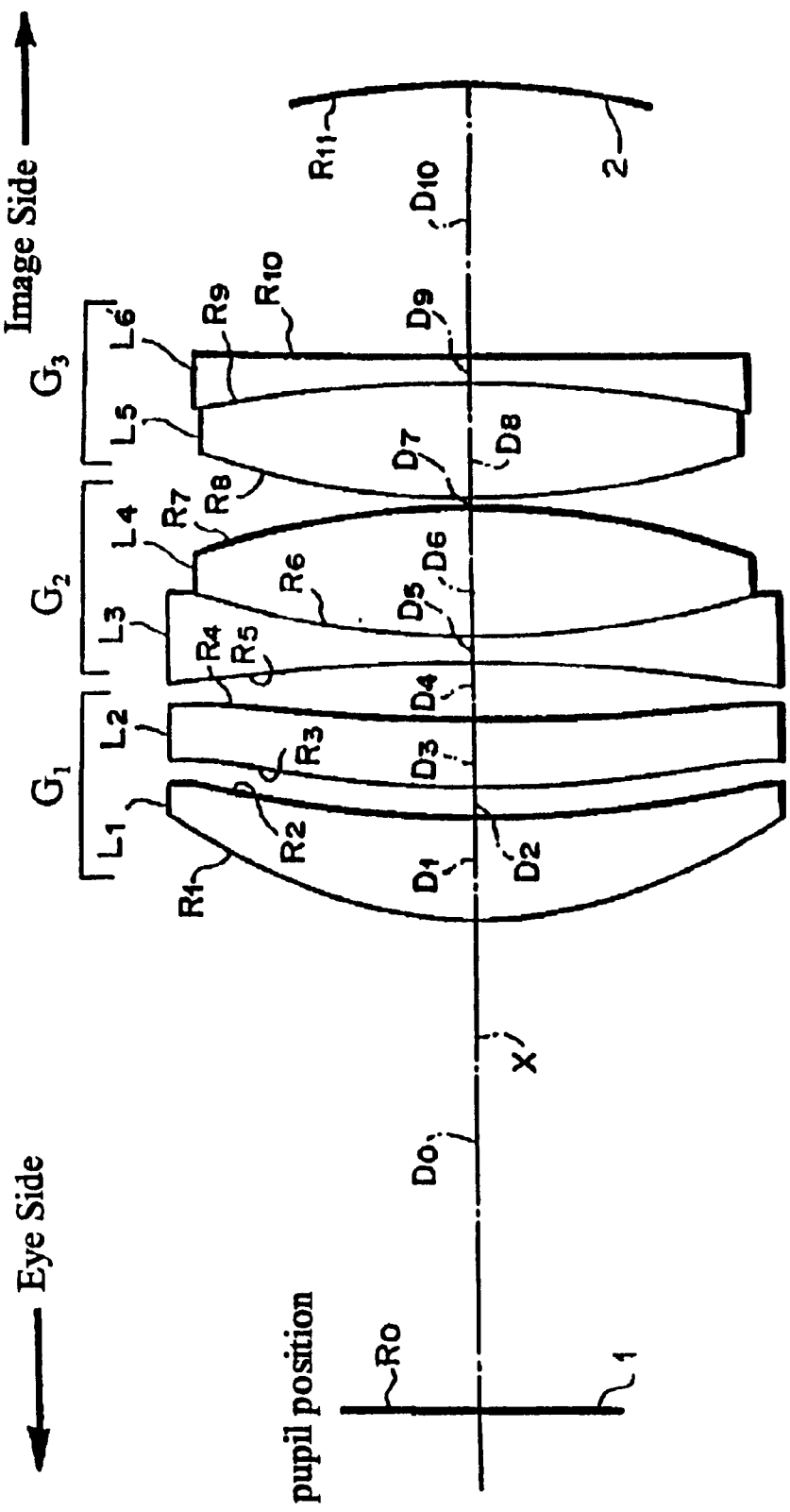
FIG. 3 shows the basic lens element configuration of the lens of Embodiment 3.

The eyepiece lens element configuration of Embodiment 3 is shown in FIG. 3. This embodiment differs from Embodiment 1 in that, in this embodiment, the two lens elements $L_3$ and $L_4$ of the second lens group $G_2$ are cemented together, and the third lens element $L_3$ is of a biconcave shape. Further, the image-side surface of the sixth lens element $L_6$ is planar.

Table 5 below gives the surface number #, in order from the eye side, the radius of curvature R in mm of each surface, the spacing D in mm between each surface, as well as the refractive index $N_d$ and the Abbe constant $v_d$ at the sodium d-line (i.e. λ=587.6 nm) of each lens element of Embodiment 3.

TABLE 5

| # | R | D | $N_d$ | $v_d$ |
|---|---|---|---|---|
| 0 | (Pupil position) | 25.963 | | |
| 1 | 25.5507 | 5.095 | 1.71300 | 53.9 |
| 2 | 60.9539 | 1.595 | | |
| 3* | 48.1229 | 3.454 | 1.50670 | 50.6 |
| 4 | 114.5217 | 3.000 | | |
| 5 | −107.9667 | 1.500 | 1.84666 | 23.8 |
| 6 | 46.4779 | 6.608 | 1.71300 | 53.9 |
| 7 | −41.5920 | 0.509 | | |
| 8 | 41.8755 | 6.036 | 1.71300 | 53.9 |
| 9 | −68.3444 | 1.500 | 1.84666 | 23.8 |
| 10 | ∞ | 13.796 | | |
| 11 | −40.0000 | (Image display surface) | | |
| | f = 27.00 mm | $F_{NO.}$ = 1.94 | ω = 20.0° | |

As shown in the bottom portion of the Table, the focal distance of the eyepiece lens of Embodiment 3 is 27.00 mm, the $F_{NO.}$=1.94, and the half-field angle ω is 20.0°. Any surface marked with a * to the right of the surface number # in Table 5 is an aspherical surface, and the aspherical surface shape is expressed by Equation (A) above. The coefficients that relate to the aspherical surface #3 above are indicated in Table 6.

TABLE 6

| K | $A_4$ | $A_6$ | $A_8$ | $A_{10}$ |
|---|---|---|---|---|
| 1.0000000 | −0.1888700 × 10⁻⁴ | 0.1217837 × 10⁻⁷ | −0.1415869 × 10⁻⁹ | 0.3072742 × 10⁻¹² |

Embodiment 4

Figure 4:
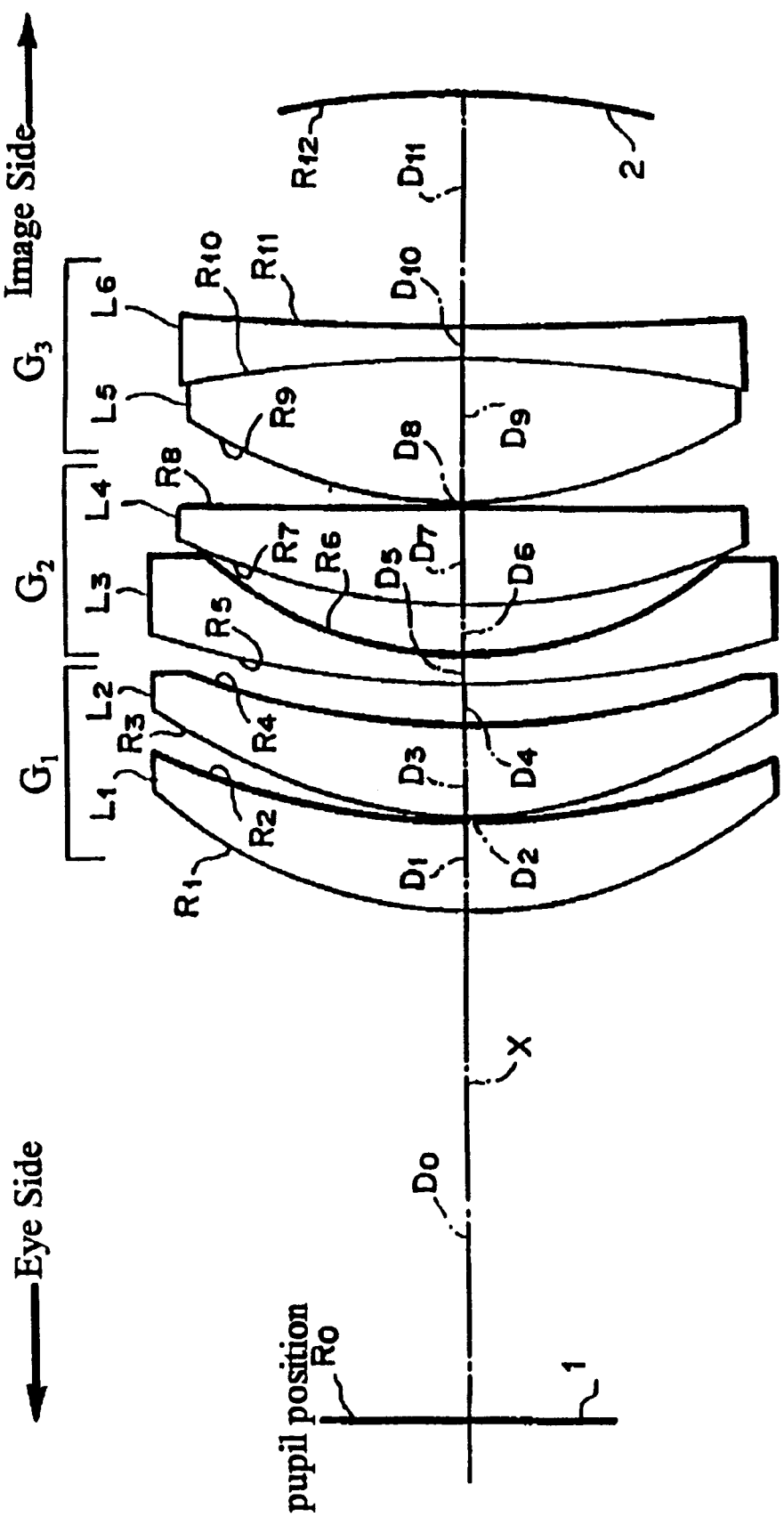
FIG. 4 shows the basic lens element configuration of the lens of Embodiment 4.
Figure 5:
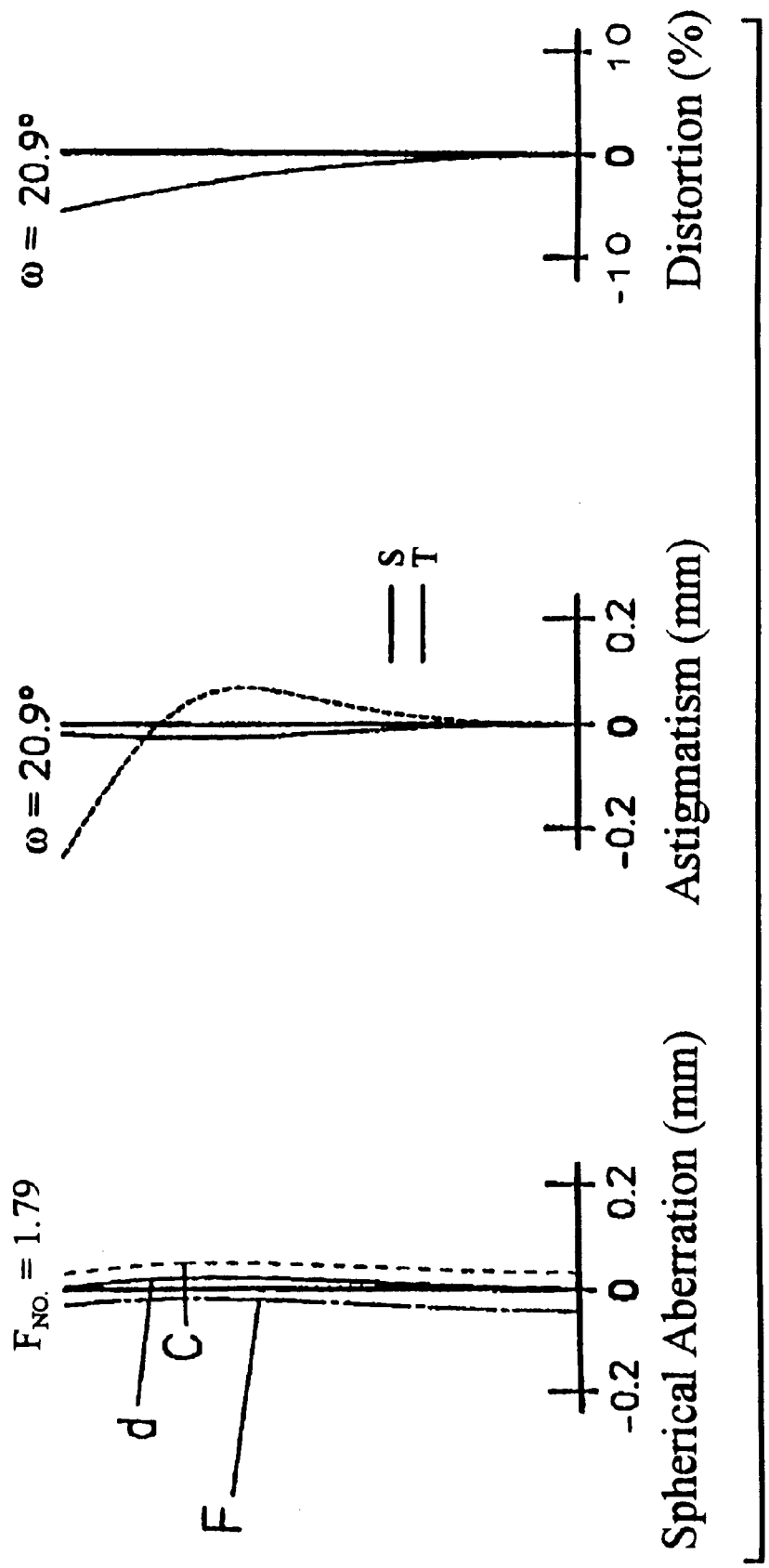
FIG. 5 shows the spherical aberration, astigmatism, and distortion of the lens of Embodiment 1.
Figure 6:
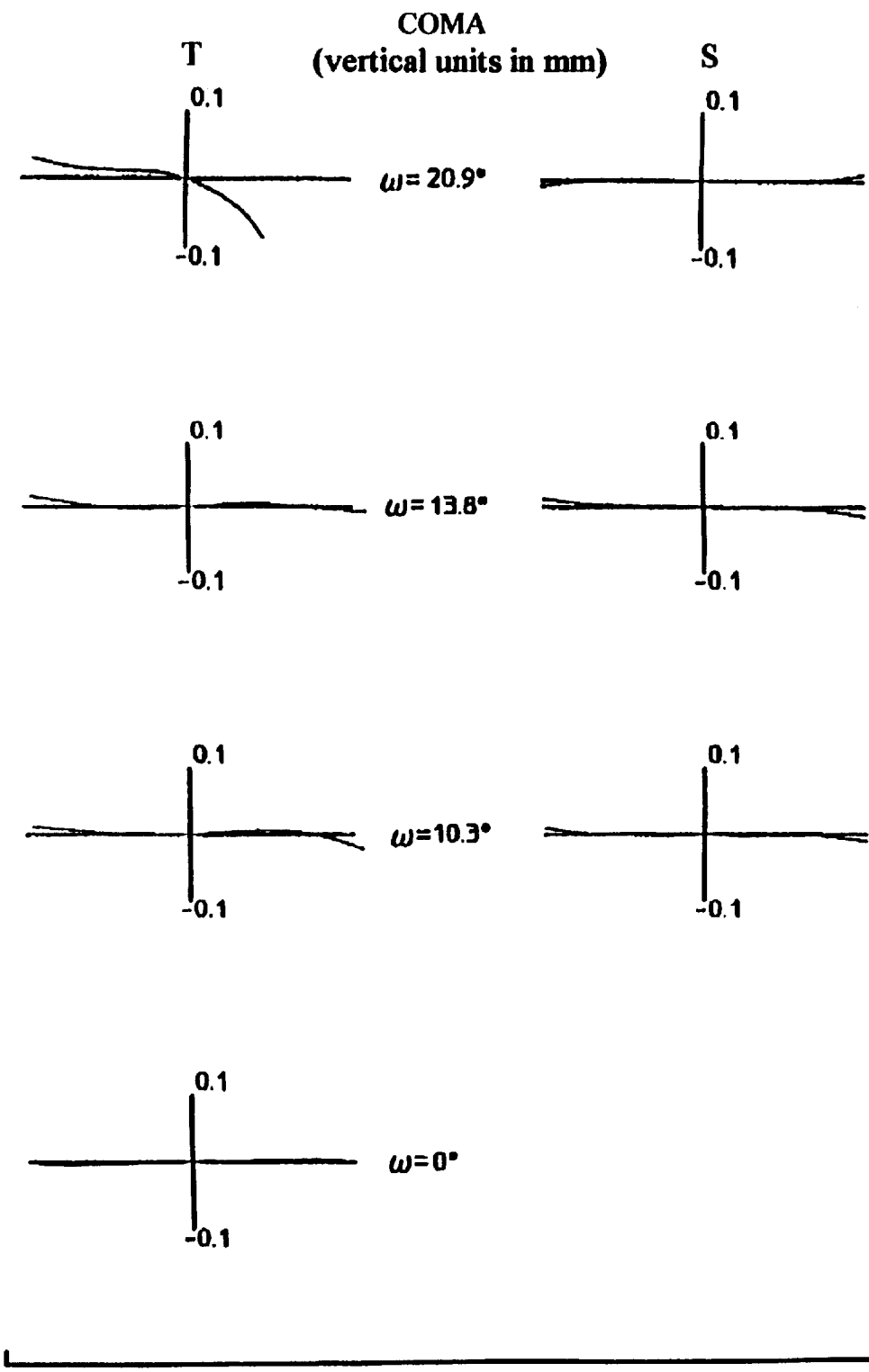
FIG. 6 shows the coma of the lens of Embodiment 1, for various half-field angles ω, in the tangential T and sagittal S directions.
Figure 7:
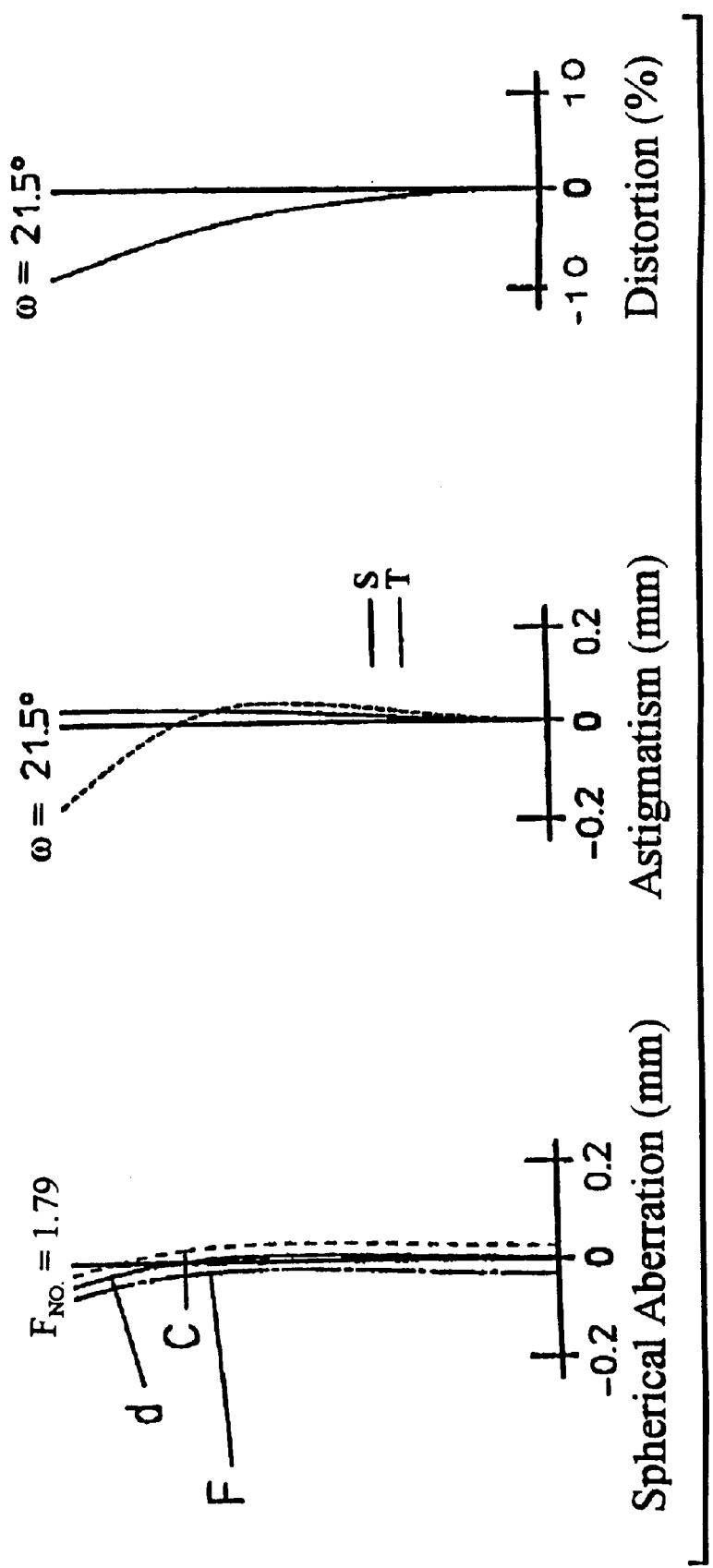
FIG. 7 shows the spherical aberration, astigmatism, and distortion of the lens of Embodiment 2.
Figure 8:
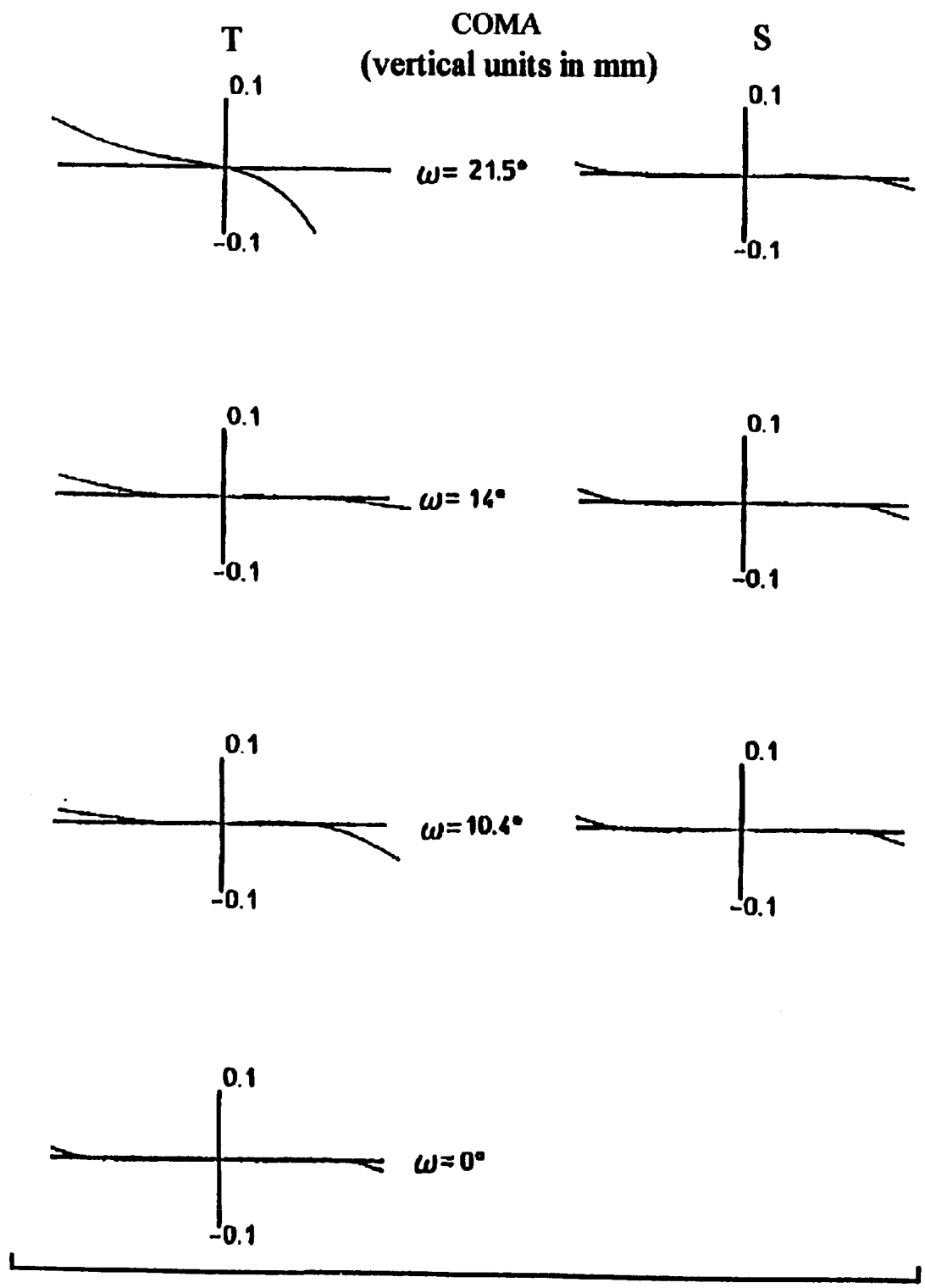
FIG. 8 shows the coma of the lens of Embodiment 2, for various half-field angles ω, in the tangential T and sagittal S directions.
Figure 9:
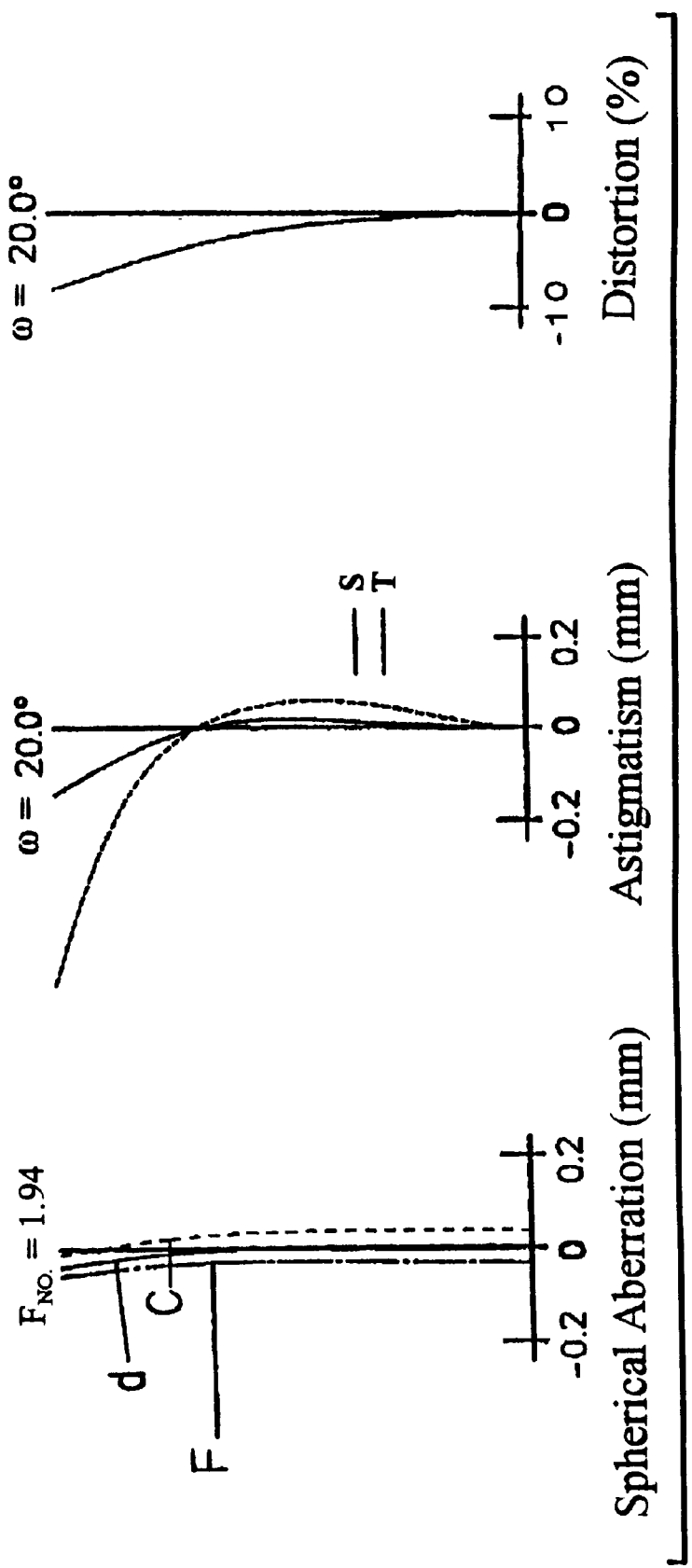
FIG. 9 shows the spherical aberration, astigmatism, and distortion of the lens of Embodiment 3.
Figure 10:
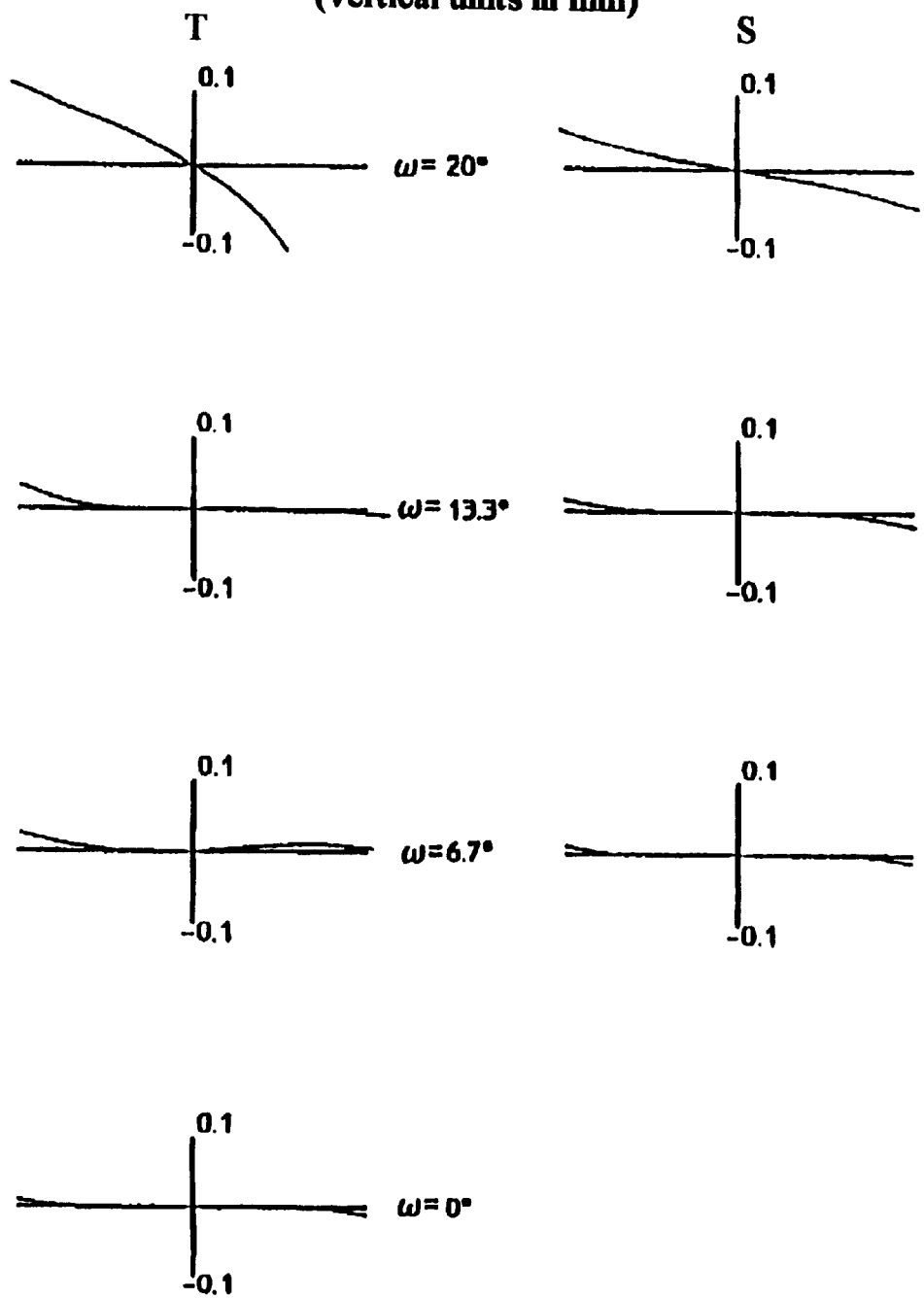
FIG. 10 shows the coma of the lens of Embodiment 3, for various half-field angles ω, in the tangential T and sagittal S directions.
Figure 11:
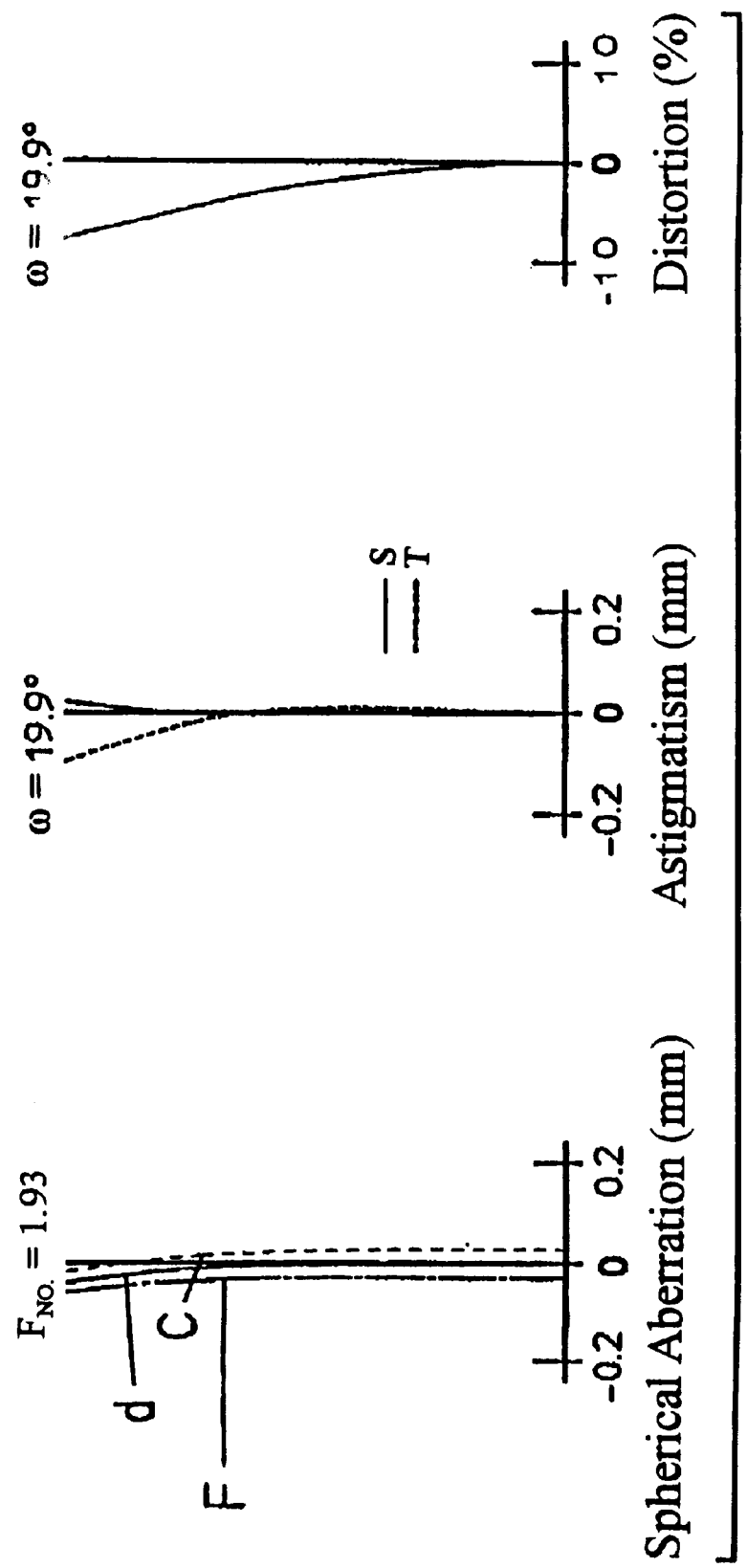
FIG. 11 shows the spherical aberration, astigmatism, and distortion of the lens of Embodiment 4.
Figure 12:
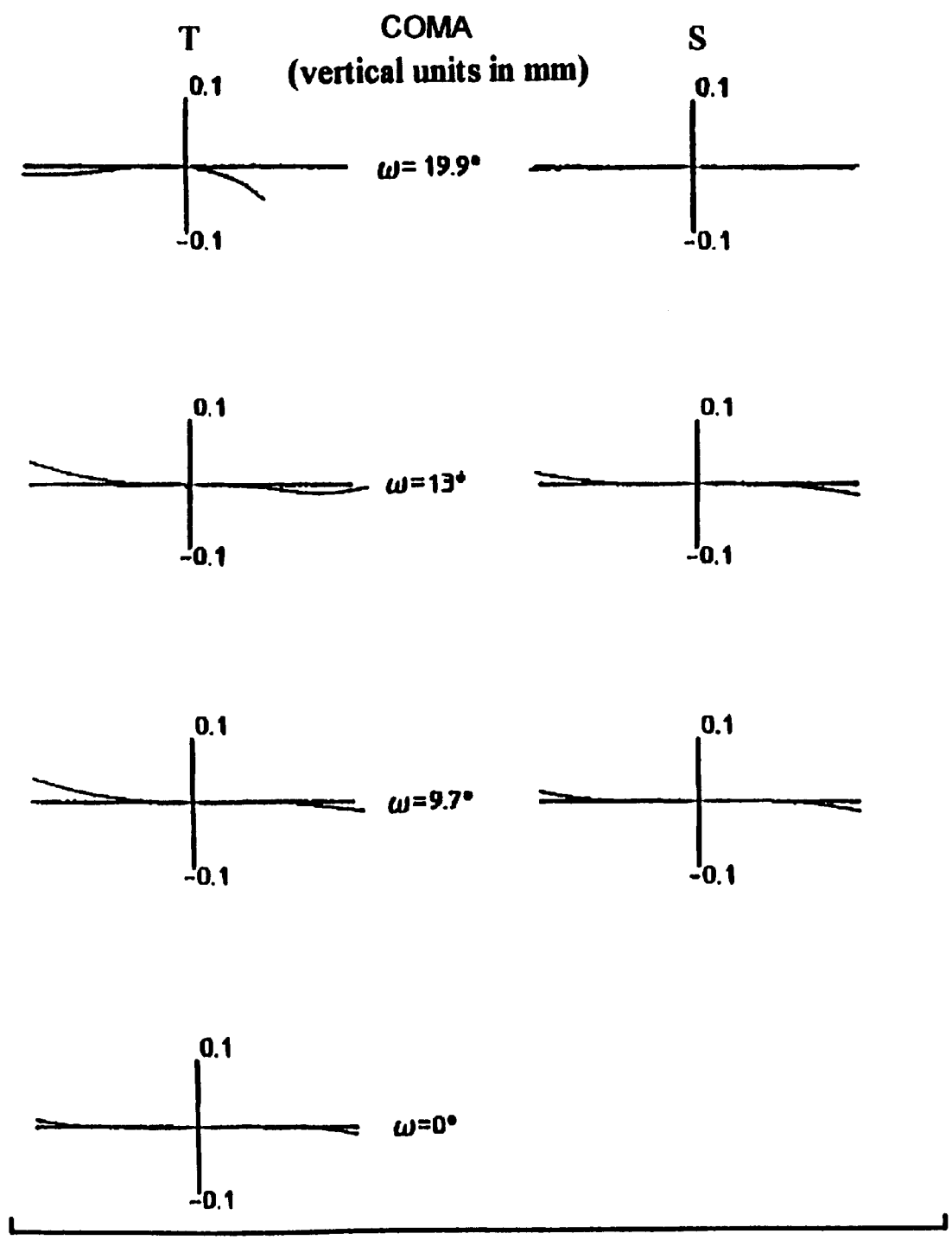
FIG. 12 shows the coma of the lens of Embodiment 4, for various half-field angles ω, in the tangential T and sagittal S directions.

The eyepiece lens element configuration of Embodiment 4 is shown in FIG. 4. The configuration is similar to that of Embodiment 1 but differs in that, in Embodiment 4, the image-side surface of the fourth lens element $L_4$ is planar, the surface on the image-side of the sixth lens element $L_6$ is planar, and the eye-side surfaces of the first lens element $L_1$ and the second lens element $L_2$, both in the first lens group $G_1$, are aspherical.

Table 7 below gives the surface number #, in order from the eye side, the radius of curvature R in mm of each surface, the spacing D in mm between each surface, as well as the refractive index $N_d$ and the Abbe constant $v_d$ at the sodium d-line (i.e. λ=587.6 nm) of each lens element of Embodiment 4.

TABLE 7

| # | R | D | $N_d$ | $v_d$ |
|---|---|---|---|---|
| 0 | (Pupil position) | 25.00 | | |
| 1* | 21.2823 | 4.600 | 1.71300 | 53.9 |
| 2 | 34.8121 | 0.300 | | |
| 3* | 20.7282 | 4.600 | 1.49023 | 57.5 |
| 4 | 36.6496 | 2.080 | | |
| 5 | 49.0229 | 1.500 | 1.84666 | 23.8 |
| 6 | 18.7354 | 2.450 | | |
| 7 | 32.3292 | 4.600 | 1.71300 | 53.9 |
| 8 | ∞ | 0.300 | | |
| 9 | 24.3985 | 7.000 | 1.71300 | 53.9 |
| 10 | −60.6419 | 1.500 | 1.84666 | 23.8 |
| 11 | 182.1882 | 11.679 | | |
| 12 | −40.0000 | (Image display surface) | | |
| | f = 27.01 mm | $F_{NO.}$ = 1.93 | ω = 19.9° | |

As shown in the bottom portion of the Table 7, the focal distance f of the eyepiece lens is 27.01 mm, the $F_{NO.}$ is 1.93, and the half-field angle ω is 19.9 degrees. Any surface marked with a * to the right of the surface number # in Table 7 is an aspherical surface, and the aspherical surface shape is expressed by Equation (A) above. The coefficients that relate to the aspherical surfaces 1 and 3 above are indicated in Table 8.

TABLE 8

| # | K | $A_4$ | $A_6$ | $A_8$ | $A_{10}$ |
|---|---|---|---|---|---|
| 1 | 1.0000000 | $0.1056292 \times 10^{-6}$ | $-0.7819249 \times 10^{-10}$ | $-0.1051185 \times 10^{-12}$ | $-0.1014760 \times 10^{-15}$ |
| 3 | 1.0000000 | $-0.1449433 \times 10^{-4}$ | $-0.5846082 \times 10^{-8}$ | $-0.9769024 \times 10^{-10}$ | $-0.9624148 \times 10^{-13}$ |

The ratios listed in Conditions (1)–(4), in other words, the values of $f_1/f$, $f/f_2$, $f_3/f$, and $R_i/f$, as well as the entrance pupil diameter, are given for each of Embodiments 1–4 in Table 9. As can be seen by comparing these values to the respective Conditions (1)–(4), Conditions (1)–(4) are satisfied for each of Embodiments 1–4.

TABLE 9

| | Embodiment 1 | Embodiment 2 | Embodiment 3 | Embodiment 4 |
|---|---|---|---|---|
| $f_1/f$ | 1.342 | 1.538 | 1.619 | 1.443 |
| $f/f_2$ | 0.348 | 0.379 | 0.195 | −0.110 |
| $f_3/f$ | 4.778 | 5.554 | 2.439 | 1.590 |
| $R_i/f$ | −1.599 | −1.278 | −1.482 | −1.481 |
| entrance pupil diameter | 14.0 | 14.0 | 13.9 | 14.0 |

Moreover, the spherical aberration, astigmatism, and distortion that occur in Embodiments 1–4 are shown in FIGS. 5, 7, 9 and 11 respectively. Further, the coma for Embodiments 1–4 is shown in FIGS. 6, 8, 10 and 12, respectively. In each of FIGS. 6, 8, 10, and 12, coma in the tangential direction T is illustrated by the four curves in the left column, and coma in the sagittal direction S is illustrated by the three curves in the right column. The curves from top to bottom represent the coma at different half-field angles ω (i.e., different picture angles), with the angle ω as indicated. For indicating coma in the sagittal direction S, only three curves are given, since the sagittal coma on-axis (i.e., at ω=0.0) is identical to the tangential coma T on axis. As is evident from FIGS. 5–12, favorable correction of each of these aberrations is achieved in each embodiment described above.

As described above, according to the eyepiece for a display image observation device of the present invention, and by way of the prescribed lens composition, observation is made possible of a good image quality even under conditions accompanying vibrations such as when the observer is riding in a vehicle or during walking, and while providing a lightweight and compact composition, favorable correction of the various aberrations is made possible with a large entrance pupil diameter.

The invention being thus described, it will be obvious that the same may be varied in many ways. For example, the focal length, radii of curvature and spacings may be readily scaled. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. An eyepiece lens for a display image observation device having only six lens elements with refractive power, said eyepiece lens comprising, in the order from the eye side:

a first lens group formed of two lens elements, said first lens group having positive refractive power;

a second lens group formed of two lens elements which are either separated by air or cemented together, one of said two lens elements having negative refractive power and the other lens element having positive refractive power; and a third lens group formed of two lens elements which are either separated by air or cemented together, one of said two lens elements having negative refractive power and the other lens element having positive refractive power; wherein the lens element in said first lens group that is nearest the eye side is of positive meniscus shape with its convex surface on the eye side.

2. The eyepiece lens of claim 1, wherein at least one surface of the lens elements of the first lens group is aspherical.

3. The eyepiece of claim 1, wherein the following condition is satisfied:

$$1.1 < f_1/f < 2.0$$

where $f_1$ is the focal distance of the first lens group, and f is the focal distance of the eyepiece lens.

4. The eyepiece of claim 1, wherein the following condition is satisfied $$-0.09 < f/f_2 < 0.45$$

where f is the focal distance of the eyepiece lens, and $f_2$ is the focal distance of the second lens group.

5. The eyepiece of claim 1, wherein the following condition is satisfied $$1.2 < f_3/f < 7.0$$

where $f_3$ is the focal distance of the third lens group, and f is the focal distance of the eyepiece lens.

6. The eyepiece of claim 1, wherein the following condition is satisfied $$-2.0 < R_i/f < -1.0$$

where $R_i$ is the radius of curvature of the image display surface, and f is the focal distance of the eyepiece lens.

\* \* \* \* \*